United States Patent
Watanabe et al.

(10) Patent No.: US 9,791,846 B2
(45) Date of Patent: Oct. 17, 2017

(54) NUMERICAL CONTROL DEVICE

(71) Applicants: Mitsuo Watanabe, Tokyo (JP); Masakazu Sagasaki, Tokyo (JP); Junichi Kamata, Tokyo (JP); Hiroshi Shinohara, Nagano (JP); Hajime Matsumaru, Nagano (JP); Hitoshi Matsumoto, Nagano (JP); Takanori Shinohara, Nagano (JP); Akihiko Shinohara, Nagano (JP); Shigeo Yanagidaira, Nagano (JP)

(72) Inventors: Mitsuo Watanabe, Tokyo (JP); Masakazu Sagasaki, Tokyo (JP); Junichi Kamata, Tokyo (JP); Hiroshi Shinohara, Nagano (JP); Hajime Matsumaru, Nagano (JP); Hitoshi Matsumoto, Nagano (JP); Takanori Shinohara, Nagano (JP); Akihiko Shinohara, Nagano (JP); Shigeo Yanagidaira, Nagano (JP)

(73) Assignees: Mitsubishi Electric Corporation, Tokyo (JP); CITIZEN WATCH CO., LTD., Nishitokyo-shi, Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days.

(21) Appl. No.: 14/759,436

(22) PCT Filed: Feb. 12, 2013

(86) PCT No.: PCT/JP2013/053269
§ 371 (c)(1),
(2) Date: Jul. 7, 2015

(87) PCT Pub. No.: WO2014/125569
PCT Pub. Date: Aug. 21, 2014

(65) Prior Publication Data
US 2016/0011579 A1    Jan. 14, 2016

(51) Int. Cl.
*G05B 19/19*   (2006.01)
*G05B 19/4103*   (2006.01)

(52) U.S. Cl.
CPC ......... *G05B 19/19* (2013.01); *G05B 19/4103* (2013.01); *G05B 2219/34123* (2013.01);
(Continued)

(58) Field of Classification Search
CPC .............................. B23B 29/125; B24B 47/10
(Continued)

(56) References Cited

U.S. PATENT DOCUMENTS

2005/0215176 A1* 9/2005 Sakagami ............... B24B 47/10
                                                                 451/5
2008/0121078 A1  5/2008 Kunimatsu et al.
2014/0102268 A1* 4/2014 Hariki ................... B23B 29/125
                                                                 82/118

FOREIGN PATENT DOCUMENTS

JP    2001150201 A    6/2001
JP    2002-96201 A    4/2002
(Continued)

OTHER PUBLICATIONS

Examination Report From The Intellectual Property Office for Taiwanese Patent Application No. 102120485, dated Mar. 10, 2015.
(Continued)

*Primary Examiner* — Mohammad Ali
*Assistant Examiner* — Sheela S Rao
(74) *Attorney, Agent, or Firm* — Sughrue Mion, PLLC

(57) ABSTRACT

To include an analysis processing unit that obtains a movement command for moving on a movement path in a machining program, and vibration conditions for vibrating along the movement path, a command-movement-amount calculation unit that calculates a command-movement amount per unit time, a vibrational-movement-amount cal-
(Continued)

culation unit that uses the vibration conditions to calculate a vibrational-movement amount per unit time at a time corresponding to the movement command, and a movement-amount combining unit that combines the command-movement amount with the vibrational-movement amount to calculate a combined movement amount, and that acquires a movement amount within the unit time such that a position, which has moved from a reference position for calculating the combined movement amount by the combined movement amount, is located on the movement path.

4 Claims, 16 Drawing Sheets

(52) U.S. Cl.
CPC ............. *G05B 2219/36204* (2013.01); *G05B 2219/37077* (2013.01); *G05B 2219/49384* (2013.01)

(58) Field of Classification Search
USPC ........................................ 700/159, 160, 175
See application file for complete search history.

(56) References Cited

FOREIGN PATENT DOCUMENTS

| | | | | |
|---|---|---|---|---|
| JP | 2005-7560 | A | 1/2005 | |
| JP | 2008-68364 | A | 3/2008 | |
| JP | 2008-126391 | A | 6/2008 | |
| JP | 4293132 | B2 * | 7/2009 | ............. B24B 47/10 |
| JP | 2011-221612 | A | 11/2011 | |
| JP | 2012-45693 | A | 3/2012 | |
| JP | 5033929 | B1 * | 9/2012 | ........... B23B 29/125 |
| JP | 5033929 | B2 | 9/2012 | |
| JP | 5139591 | B1 | 2/2013 | |
| JP | 5139591 | B2 | 2/2013 | |
| JP | 5139592 | B1 | 2/2013 | |
| JP | 5139592 | B2 | 2/2013 | |

OTHER PUBLICATIONS

Notice of Rejection for Japanese Patent Application No. 2013-550065, dated Feb. 7, 2014.
International Search Report of PCT/JP2013/053269, dated May 14, 2013. [PCT/ISA/210].

* cited by examiner

FIG.2
(a)
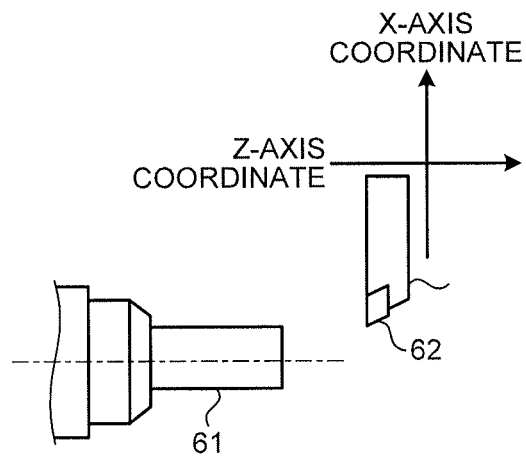
(b)
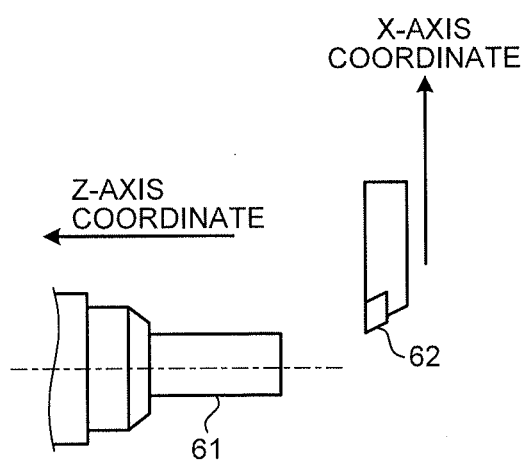

```
401 — M3 S1000;                    (MAIN-SHAFT ROTATING COMMAND)
402 — G200 F50 A0.03;              (START OF VIBRATION CUTTING  F: FREQUENCY, A: AMPLITUDE)
403 — G01 X10.0 Z20.0 F0.01;       (LINEAR INTERPOLATION)
404 — G02 X14.0 Z23.5 R4.0;        (CIRCULAR INTERPOLATION)
405 — G201;                        (END OF VIBRATION CUTTING)
```

US 9,791,846 B2

NUMERICAL CONTROL DEVICE

CROSS REFERENCE TO RELATED APPLICATIONS

This application is a National Stage of International Application No. PCT/JP2013/053269 filed Feb. 12, 2013, the contents of all of which are incorporated herein by reference in their entirety.

FIELD

The present invention relates to a numerical control device.

BACKGROUND

A numerical control device has been proposed for the conventional machining process of turning. The numerical control device includes a cutting-tool feed mechanism that feeds a cutting tool to a workpiece in at least two axial directions; and a control mechanism that controls the cutting-tool feed drive motor such that the cutting tool vibrates at a low frequency in at least two axial directions (see, for example, Patent Literature 1). In this numerical control device, the control mechanism includes an operation unit that performs various settings; a vibration-cutting-information storage unit that stores therein in advance at least the amount of forward movement, the amount of backward movement, the velocity of forward movement, and the velocity of backward movement of the cutting-tool feed mechanism according to mechanical characteristics, such as the inertia of the feed axis and motor characteristics, as a table of data used to synchronize and feed the cutting tool in at least two axial directions so as to be operable at a low frequency of 25 hertz or higher according to the rotational speed of the workpiece, or the amount of feeding of the cutting tool per revolution of the cutting tool, which are set by the operation unit; and a motor control unit that controls the cutting-tool feed drive motor on the basis of the data stored in the vibration-cutting-information storage unit.

Due to this configuration, in the case where a rotational speed of the workpiece, or an amount of feeding the cutting tool per revolution of the cutting tool, set by the operation unit, is present in the table, cutting work is performed by the amount of forward movement, the amount of backward movement, the speed of forward movement and that of backward movement of the cutting-tool feed mechanism corresponding to the set value. Further, in the case where a rotational speed of the workpiece or an amount of feeding the cutting tool per revolution of the cutting tool, which are set by the operation unit, is not present in the table, a warning that an appropriate value is not programmed is displayed, and processing is finished.

Another numerical control device for executing a contouring control by controlling two or more control axes for executing the contouring control has been proposed. The numerical control device simultaneously controls the two or more control axes to perform a chopping operation, and at the same time, generates movement data for executing the contouring control (see, for example, Patent Literature 2).

CITATION LIST

Patent Literatures

Patent Literature 1: Japanese Patent No. 5033929
Patent Literature 2: Japanese Patent No. 4293132

SUMMARY

Technical Problem

However, according to Patent Literature 1 listed above, there is a problem in that it is difficult to create data to be set in the table in order to synchronize and feed the cutting tool in at least two axial directions to be operable at a low frequency of 25 Hz or higher. For example, when the table is created, the amount of forward movement, the amount of backward movement, the speed of forward movement, and the speed of backward movement of the cutting-tool feed mechanism need to be defined for each rotational speed of the workpiece or each amount of feeding the cutting tool per revolution of the cutting tool. Therefore, it is necessary in the table to incorporate all the rotational speeds of the workpiece or the amounts of feeding the cutting tool per revolution of the cutting tool, which can be used in the numerical control device. Accordingly, considerable time and effort are required to create the table.

When a rotational speed of the workpiece or an amount of feeding the cutting tool per revolution of the cutting tool, which has not been set in the table, is input, machining is not performed, and processing is finished. This results in a problem that it is not clear whether it is possible to perform machining under the conditions input from the operation unit until actual processing is started.

Patent Literature 2 relates to a numerical control device for executing a contouring control, while performing chopping. The chopping operation is designed to execute a contouring control with vibrations similarly to Patent Literature 1. In the chopping operation, the vibration direction is assumed to intersect the direction of the contouring control at a predetermined angle, and therefore it is not considered that a tool is vibrated in a machining direction.

The present invention has been achieved to solve the above problems, and an object of the present invention is to provide a numerical control device for machining while vibrating a tool along a machining path, in which without the need for a table having tool vibration conditions stored therein, when a machining path is given by a machining program, machining can be performed while vibrating the tool at a predetermined frequency on the machining path.

Solution to Problem

A numerical control device according to one aspect of the present invention, by which machining is performed on a machining object while moving a tool and the machining object relative to each other by two or more drive shafts provided in the tool and/or the machining object is constructed to include: an analysis processing unit that obtains a movement command for moving on a movement path in a machining program, and vibration conditions for vibrating along the movement path; a command-movement-amount calculation unit that calculates a command-movement amount that is a movement amount per unit time according to the movement command; a vibrational-movement-amount calculation unit that uses the vibration conditions to calculate a vibrational-movement amount that is a movement amount due to vibrations per the unit time at a time corresponding to the movement command; and a movement-amount combining unit that combines the command-movement amount with the vibrational-movement amount to calculate a combined movement amount, and that acquires a movement amount within the unit time such that a position, having moved from a reference position for calculating the combined movement amount by the combined movement amount, is located on the movement path.

Advantageous Effects of Invention

According to the present invention, the numerical control device makes it possible to apply vibrations along a machining path based on given vibration conditions, for example, frequency and amplitude. Therefore, machining can be performed under various conditions without the need for a table having tool vibration conditions stored therein.

BRIEF DESCRIPTION OF DRAWINGS

FIG. 2 are diagrams illustrating a configuration of axes of the numerical control device according to the first embodiment.

DESCRIPTION OF EMBODIMENTS

Exemplary embodiments of a numerical control device according to the present invention will be described below in detail with reference to the accompanying drawings. The present invention is not limited to these embodiments.

First Embodiment

Figure 1:
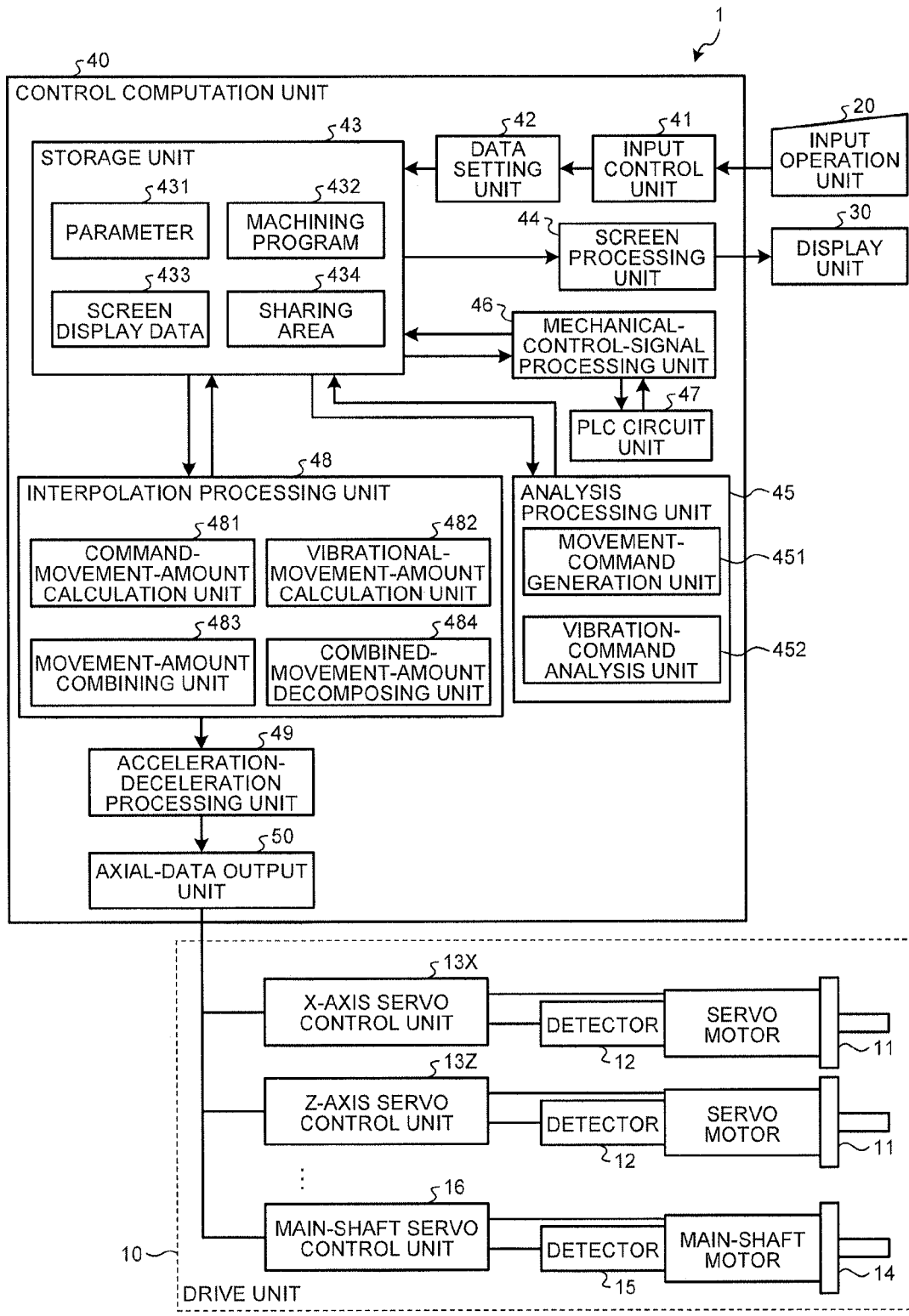
FIG. 1 is a block diagram illustrating a configuration example of a numerical control device according to a first embodiment.

FIG. 1 is a block diagram illustrating an example configuration of a numerical control device according to a first embodiment. A numerical control device 1 includes a drive unit 10; an input operation unit 20; a display unit 30; and a control computation unit 40.

The drive unit 10 is a mechanism that drives one or both of a workpiece and a tool in at least two axial directions. The drive unit 10 includes a servo motor 11 that moves a workpiece and/or tool in each of the axial directions specified in the numerical control device 1; a detector 12 that detects the position and velocity of the servo motor 11; and a servo control unit 13 for each of the axial directions (an X-axis servo control unit 13X, a Z-axis servo control unit 13Z, . . . (hereinafter, simply expressed as "servo control unit 13" when it is not necessary to distinguish the drive-shaft directions from each other)), where the servo control unit 13 controls the position and velocity of a workpiece and/or tool on the basis of the position and velocity transmitted from the detector 12. The drive unit 10 further includes a main-shaft motor 14 that rotates a main shaft provided in a workpiece; a detector 15 that detects the position and rotational speed of the main-shaft motor 14; and a main-shaft servo-control unit 16 that controls, on the basis of the position and rotational speed transmitted from the detector 15, the rotation of the main shaft provided for the workpiece.

The input operation unit 20 includes an input unit such as a keyboard, a button, or a mouse, through which a user inputs a command and the like for the numerical control device 1, or inputs a machining program, a parameter, or the like. The display unit 30 includes a liquid crystal display device or other display unit on which information processed by the control computation unit 40 is displayed.

The control computation unit 40 includes an input control unit 41, a data setting unit 42, a storage unit 43, a screen processing unit 44, an analysis processing unit 45, a mechanical-control-signal processing unit 46, a PLC (Programmable Logic Controller) circuit unit 47, an interpolation processing unit 48, an acceleration-deceleration processing unit 49, and an axial-data output unit 50.

The input control unit 41 receives information that is input from the input operation unit 20. The data setting unit 42 stores the information received by the input control unit 41 in the storage unit 43. For example, when the input content relates to editing of a machining program 432, the machining program 432 stored in the storage unit 43 is changed by the edited content. When a parameter is input, this input parameter is stored in a storage area of a parameter 431 in the storage unit 43.

The storage unit 43 stores therein information such as the parameter 431 to be used for processing in the control computation unit 40; the machining program 432 to be executed; and screen display data 433 to be displayed on the display unit 30. The storage unit 43 includes a sharing area 434 that stores therein temporarily-used data other than the parameter 431 and the machining program 432. The screen processing unit 44 executes a control so as to display the screen display data 433 in the storage unit 43 on the display unit 30.

The analysis processing unit 45 includes a movement-command generation unit 451, which reads a machining program including one or more blocks, analyzes the read machining program block by block, and generates a movement command for movement by each block, and a vibration-command analysis unit 452, which analyzes whether a vibration command is included in the machining program and generates vibration information, when the vibration command is included in the machining program, such as frequency and amplitude included in the vibration command.

When the analysis processing unit 45 reads an auxiliary command as a command for operating a machine other than a command for operating a numerically-controlled shaft (the drive shaft), the mechanical-control-signal processing unit 46 notifies the fact that the auxiliary command has been issued to the PLC circuit unit 47. Upon reception of the notification that the auxiliary command has been issued from the mechanical-control-signal processing unit 46, the PLC circuit unit 47 performs processing corresponding to this auxiliary command.

The interpolation processing unit 48 includes a command-movement-amount calculation unit 481 that uses a movement command analyzed by the analysis processing unit 45 to calculate a command-movement amount that is a movement amount per unit time (an interpolation cycle), a vibrational-movement-amount calculation unit 482 that calculates a vibrational-movement amount that is a movement amount per unit time for vibrating a tool or a machining object, a movement-amount combining unit 483 that calculates a combined movement amount per unit time by combining the command-movement amount with the vibrational-movement amount, and a combined-movement-amount decomposing unit 484 that calculates a movement amount for each drive shaft from the combined movement amount per unit time, so as to pass through on a movement path.

The acceleration-deceleration processing unit 49 converts the combined movement amount for each drive shaft, output from the interpolation processing unit 48, into a movement command per unit time taking into account acceleration and deceleration in accordance with an acceleration-deceleration pattern designated in advance. The axial-data output unit 50 outputs the movement command per unit time processed by the acceleration-deceleration processing unit 49 to the servo control units 13X, 13Z, . . . , each of which controls each of the drive shafts.

Figures 3, 4:
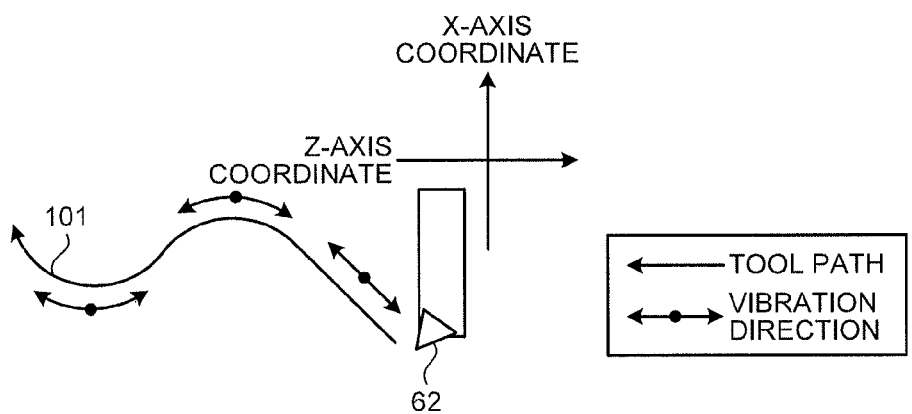
FIG. 3 is a diagram schematically illustrating a machining method according to the first embodiment.
FIG. 4 is a diagram illustrating an example of a machining program according to the first embodiment.

In order to perform machining while vibrating a tool or a workpiece, it is sufficient for the tool and the workpiece to be moved relative to each other when machining is performed, as described above. FIG. 2 are diagrams schematically illustrating a configuration of the axes of the numerical control device according to the first embodiment in which turning operation is performed. In FIG. 2, a Z axis and an X axis that are perpendicular to each other are provided on the drawing sheet. FIG. 2(*a*) is a diagram illustrating a case where a workpiece 61 is fixed; and only a tool 62 that is, for example, a turning tool that performs turning, is moved in the Z-axis and X-axis directions. FIG. 3(*b*) is a diagram illustrating a case where the workpiece 61 is moved in the Z-axis direction; and the tool 62 is moved in the X-axis direction. In either of these cases, by providing the servomotor 11 to an object to be moved (the workpiece 61 and/or the tool 62), it is made possible to perform the processing described below.

FIG. 3 is a diagram schematically illustrating a machining method according to the first embodiment. FIG. 3 illustrates a case where the Z axis and the X axis that are perpendicular to each other are provided on the drawing sheet, and machining is performed while moving the tool 62 and a machining object relative to each other along a movement path 101 on this Z-X plane. In the first embodiment, when the tool 62 is moved relative to the machining object along the movement path 101, the tool 62 is vibrated in such a manner as to follow the movement path 101. That is, in a straight-line section, the tool 62 is vibrated so as to move back and forth along the straight line, and in a curved-line section, the tool 62 is vibrated so as to move back and forth along the curved line. The description "the tool 62 is vibrated" refers to motion of the tool 62 relative to the machining object 61. In practice, either the tool 62 or the machining object 61 can be moved as illustrated in FIG. 2. The same applies to the following descriptions.

FIG. 4 is a diagram illustrating an example of a machining program according to the first embodiment. The machining program is read row by row (block by block) to be executed. In this machining program, "M3 S1000;" in a row 401 is a main-shaft rotating command, "G01 X10.0 220.0 F0.01;" in a row 403 is a linear-interpolation command, and "G02 X14.0 223.5 R4.0;" in a row 404 is a clockwise circular-interpolation command. These commands are used in general numerical control devices.

Meanwhile, "G200 F50 A0.03;" in a row 401 and "G201;" in a row 404 are vibration-cutting commands in the first embodiment. These commands are additionally provided. In this example, the command "G200" means the start of vibration cutting; and the command "G201" means the end of vibration cutting. "F" and its subsequent numerical value mean the vibration frequency (hertz), and "A" and its subsequent numerical value mean the vibration amplitude (millimeters, for example). This is merely an example. The start and the end of vibration cutting, and the vibration frequency and amplitude can be represented by other symbols. The frequency and amplitude command values can be any numerical value. However, in order to vibrate a tool more accurately on a curved path and in order to break the shavings generated by cutting into smaller pieces, generally minute vibrations (with the amplitude of several hundred micrometers or less, and the frequency of several hundred hertz or lower) are instructed.

Figure 5:
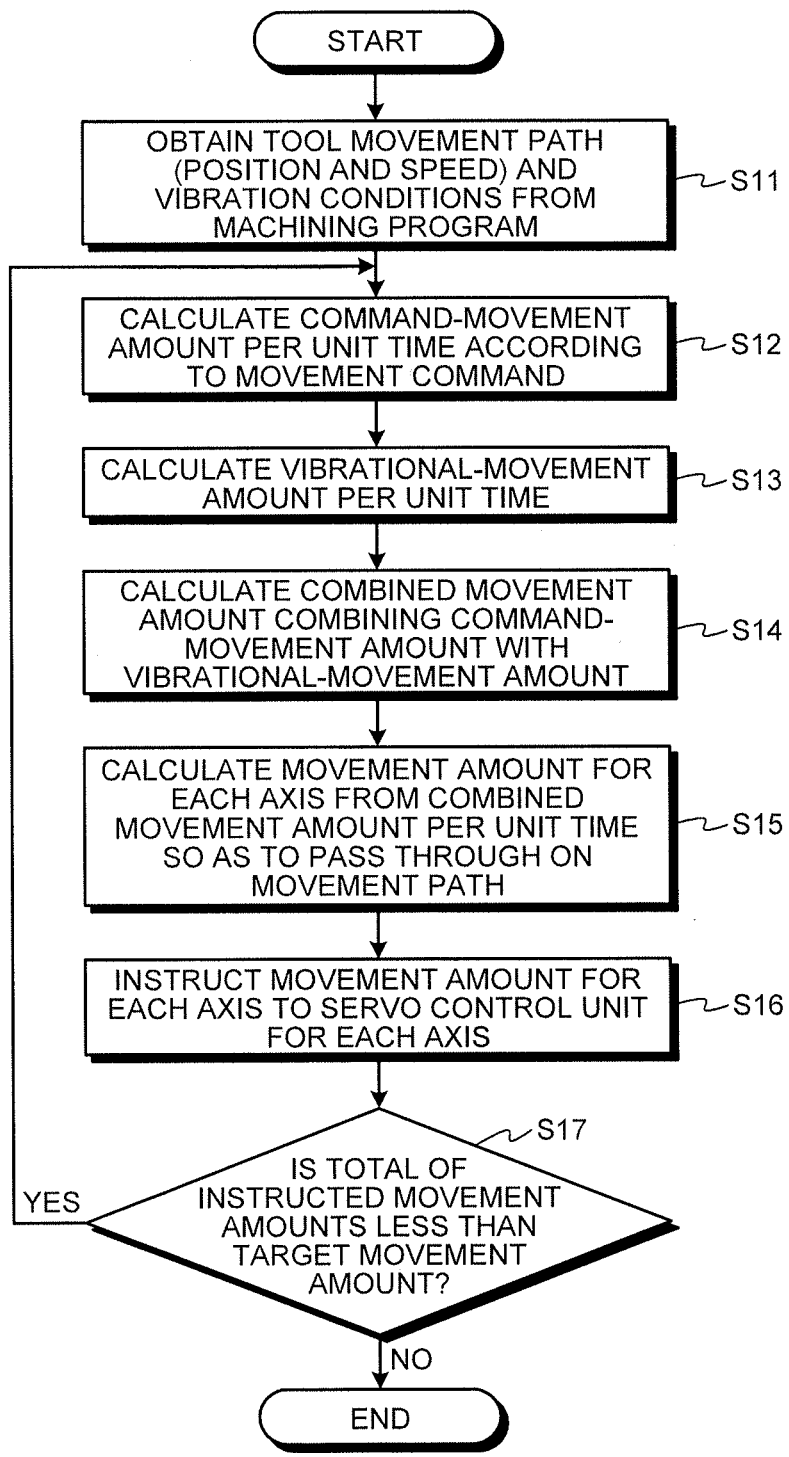
FIG. 5 is a flowchart illustrating an example of interpolation processing with vibrations according to the first embodiment.

Next, a machining method performed by the numerical control device according to the first embodiment is described. FIG. 5 is a flowchart illustrating an example of interpolation processing with vibrations according to the first embodiment.

First, the movement-command generation unit 451 in the analysis processing unit 45 outputs a movement command with a movement path including the position and speed of a tool and/or a machining object from a machining program to the interpolation processing unit 48. The vibration-command analysis unit 452 outputs vibration conditions, including frequency and amplitude, to the interpolation processing unit 48. The interpolation processing unit 48 obtains the movement command and the vibration conditions, which are both output from the analysis processing unit 45 (Step S11).

Subsequently, the command-movement-amount calculation unit 481 in the interpolation processing unit 48 calculates a command-movement amount per unit time (an interpolation cycle) from the movement command (a movement amount according to the movement command) (Step S12). This is acquired by a preset method depending on the type of interpolation such as linear interpolation or circular interpolation.

Thereafter, the vibrational-movement-amount calculation unit 482 calculates a vibrational-movement amount that is a movement amount due to vibrations per unit time (Step S13). Regarding the vibrational-movement amount, a sine wave under the obtained vibration conditions (frequency and amplitude) is assumed, and then the position on the sine wave corresponding to the present interpolation time is acquired so as to acquire the vibrational-movement amount corresponding to the present interpolation time as a difference between the positions at the present interpolation time and the last interpolation time (that is, if the present interpolation time is t2 in FIG. 6(e), Δa2 at the time t2 is acquired).

Subsequently, the movement-amount combining unit 483 calculates a combined movement amount by combining the command-movement amount with the vibrational-movement amount (Step S14). Here, the vibrational-movement amount is added to the command-movement amount.

Thereafter, the combined-movement-amount decomposing unit 484 calculates an axial movement amount by decomposing the combined movement amount per unit time into components of the respective drive shafts so as to pass along the movement path (Step S15). The calculated axial movement amount is then output to the servo control unit 13 on each of the drive shafts through the axial-data output unit 50 (Step S16).

At Step S14, in a case where the terminal position of the combined movement amount is located on the opposite side of the machining start position in the machining direction, or a case where the terminal position of the combined movement amount passes over the machining end position in the machining direction, an unintended region is also machined. Therefore, in a case where the terminal position of the combined movement amount is located on the opposite side of the machining start position in the machining direction, the combined movement amount can be corrected such that the terminal position of the combined movement amount is limited up to the machining start point. And, in a case where the terminal position of the combined movement amount passes over the machining end position in the machining direction, the combined movement amount can be corrected such that the terminal position of the combined movement amount is limited up to the machining end point.

Thereafter, the command-movement-amount calculation unit 481 determines whether the total value of the previous instructed command-movement amounts is less than a target movement amount (Step S17). When the total value of the command-movement amounts is less than the target movement amount (YES at Step S17), the processing returns to Step S12, and the above processing is performed repeatedly. In contrast, when the total value of the command-movement amounts reaches the target movement amount (NO at Step S17), the processing finishes because the machining has advanced to a target position.

Figure 6:
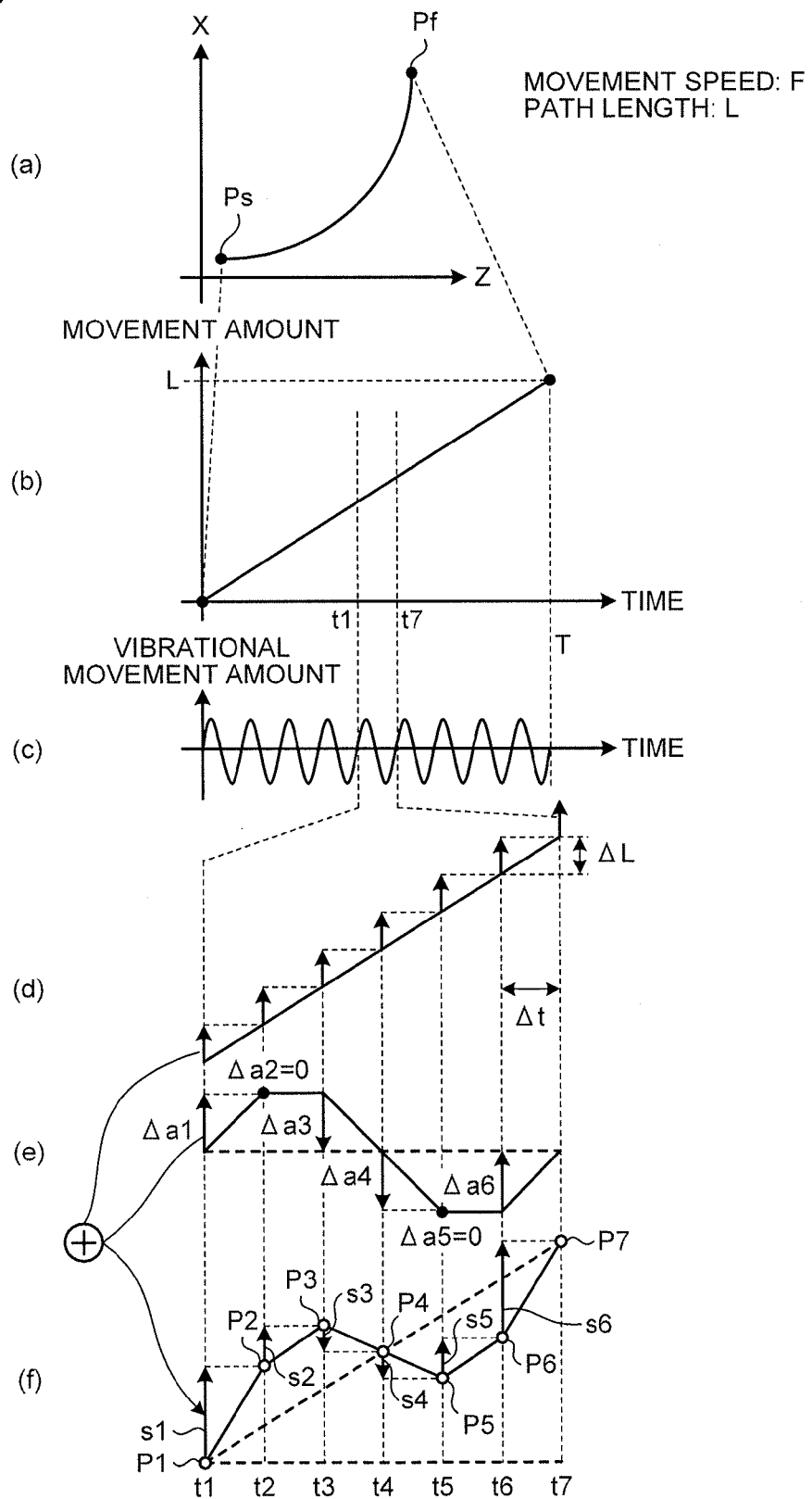
FIG. 6 are diagrams illustrating a specific process procedure example of interpolation processing with vibrations according to the first embodiment.
Figure 7:
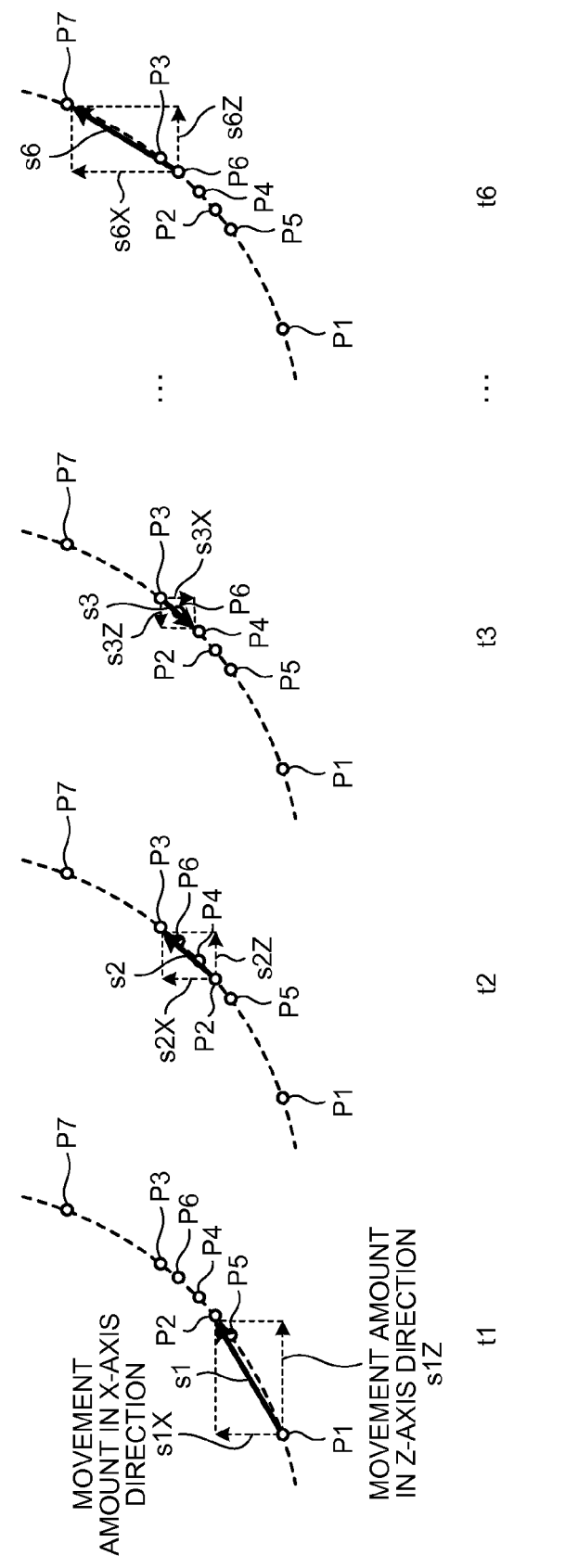
FIG. 7 is a diagram illustrating combined movement amount per unit time acquired in FIG. 6, and the direction of this combined movement amount.

FIG. 6 are diagrams illustrating a specific process procedure example of interpolation processing with vibrations according to the first embodiment. FIG. 7 is a diagram illustrating the direction and magnitude of the combined movement amount per unit time acquired in FIG. 6. As illustrated in FIG. 6(a), a case is first described in which a tool and a machining object are moved relative to each other along an arc-shaped movement path on the Z-X plane. In a machining program, a machining start point, a machining finish point, a relative movement speed F of the tool to the machining object, an interpolation method (such as linear interpolation or circular interpolation), and vibration conditions are specified. The interpolation processing unit 48 obtains these conditions at Step S11.

The command-movement-amount calculation unit 481 uses the machining start point, the machining finish point, the movement speed, and the interpolation method to acquire a movement distance L from the machining start point to the machining finish point, and a required time T. This movement distance with respect to time is as illustrated in FIG. 6(b).

Thereafter, from the movement distance L and an interpolation cycle (a unit time) Δt, the command-movement-amount calculation unit 481 acquires a command-movement amount ΔL that is a movement amount per unit time at each point in time (Step S12). The results of this command-movement amount ΔL are illustrated in FIG. 6(d). FIG. 6(d) illustrates the period between a time t1 and a time t7 in FIG. 6(b) in a magnified manner. In FIG. 6(d), the command-movement amount ΔL is consistent at any point in time.

First, the command-movement-amount calculation unit 481 acquires the command-movement amount ΔL at the time t1. The vibrational-movement-amount calculation unit 482 uses the vibration conditions obtained from the machining program to create a function that indicates change in vibrations with time illustrated in FIG. 6(c) in order to acquire a vibrational-movement amount Δa1 that is a movement amount due to vibrations per unit time (an interpolation cycle) Δt at the time t1 (Step S13). This result is illustrated in FIG. 6(e). FIG. 6(e) also illustrates the period between the time t1 and the time t7 in FIG. 6(b) in a magnified manner.

The movement-amount combining unit 483 combines the command-movement amount ΔL with the vibrational-movement amount Δa1 to acquire a combined movement amount s1 per unit time at the time t1 (Step S14). This is acquired by adding the vibrational-movement amount Δa1 acquired from FIG. 6(e) to the command-movement amount ΔL in FIG. 6(d). The result is as illustrated in FIG. 6(f). In FIG. 6(f), the combined movement amount s1 (=ΔL+Δa1) per unit time Δt at the time t1 is added to a position P1 at the time t1. The position, obtained by adding the combined movement amount s1 to this position P1 in such a manner as to pass through a movement path, is a target position P2. When the interpolation method and the movement amount are known, the target position can be calculated.

Next, according to the present position P1 on the movement path and the interpolation method, the combined-movement-amount decomposing unit 484 allocates the combined movement amount s1 per unit time to movement amounts s1Z and s1X that are components of drive axes Z and X, as illustrated at the time t1 in FIG. 7 (Step S15). The axial-data output unit 50 instructs the movement amount s1X to the X-axis servo control unit 13X, and instructs the movement amount s1Z to the Z-axis servo control unit 13Z (Step S16). The movement amounts s1Z and s1X, instructed at this time, have been subjected to acceleration-deceleration processing by the acceleration-deceleration processing unit 49.

Thereafter, whether the total value of the instructed movement amounts is less than a target movement amount is determined (Step S17). In this case, because the total value of the instructed movement amounts is less than the target movement amount, the next processing at the time t2 is performed.

At the time t2, the command-movement amount per unit time is represented as ΔL, and the vibrational-movement amount is represented as Δa2. Therefore, from these amounts ΔL and Δa2, a combined movement amount s2 per unit time (=ΔL+Δa2) is acquired. Further, based on this combined movement amount s2, a target position P3 after the unit time is defined. This position P3 is obtained by adding the combined movement amount s2 to the position P2 along the movement path. As illustrated at the time t2 in FIG. 7, from this combined movement amount s2, axial movement amounts s2Z and s2X in respective drive-shaft directions are acquired.

At the time t3, the command-movement amount per unit time is represented as ΔL, and the vibrational-movement amount is represented as Δa3. Therefore, from these amounts ΔL and Δa3, a combined movement amount s3 per unit time (=ΔL+Δa3) is acquired. Further, based on this combined movement amount s3, a target position P4 after the unit time is defined. This position P4 is obtained by adding the combined movement amount s3 (=ΔL+Δa3) to the position P3 along the movement path. As illustrated in FIG. 6(f), this combined movement amount s3 is directed inversely to the combined movement amount s1 at the time t1 and the combined movement amount s2 at the time t2. As illustrated at the time t3 in FIG. 7, from this combined movement amount s3, axial movement amounts s3Z and s3X in the respective drive-shaft directions are acquired. The same processing is performed also on the subsequent points.

At the time t6, the command-movement amount per unit time is represented as ΔL, and the vibrational-movement amount is represented as Δa6. Therefore, from these amounts ΔL and Δa6, a combined movement amount s6 per unit time (=ΔL+Δa6) is acquired. Further, based on this combined movement amount s6, a target position P7 after the unit time is defined. This position P7 is obtained by adding the combined movement amount s6 to the position P6 along the movement path. As illustrated at the time t6 in FIG. 7, from this combined movement amount s6, axial movement amounts s6Z and s6X in respective drive-shaft directions are acquired. In this example, the position P7 coincides with the position at the time t7 on the movement path in the case where vibrations are not applied. In the manner as described above, processing is performed in which a tool is moved relative to a workpiece, while being applied with vibrations along a movement path.

Figure 8:
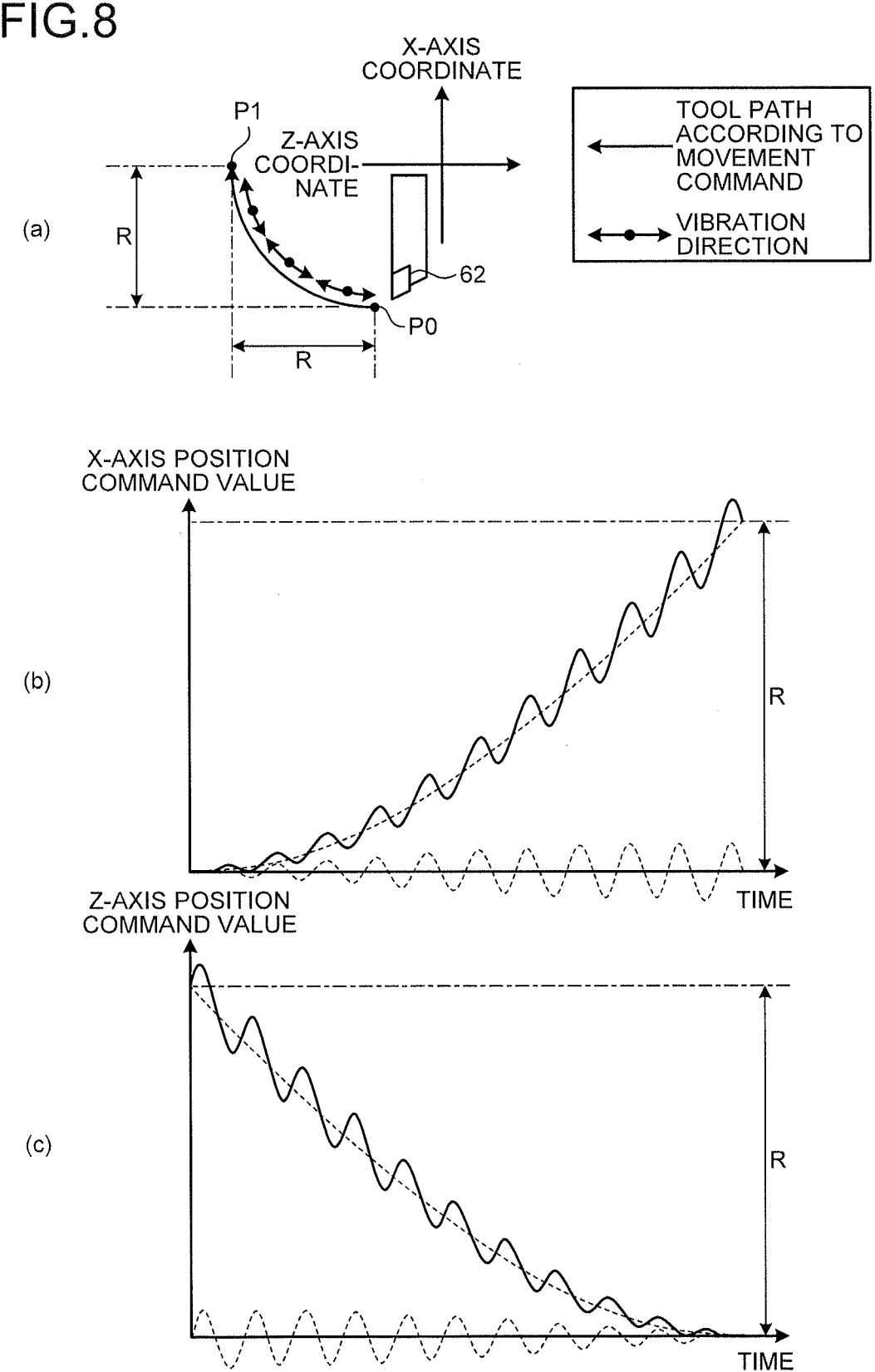
FIG. 8 illustrate an X-axis command position and a Z-axis command position in a case of a circular movement path.

FIG. 8 are diagrams illustrating an X-axis command position and a Z-axis command position in a case of a circular movement path. As illustrated in FIG. 8(a), the Z axis and the X axis are defined on the drawing sheet; and the position of the tool 62 or a workpiece is moved such that the tool 62 draws a circular movement path relative to the workpiece on the Z-X plane. During this machining, vibrations are applied in such a manner that the position of vibrations draws a sine curve plotted against time. The movement direction of the tool 62 relative to the workpiece at a machining start point P0 is in the Z-axis direction. The movement direction of the tool 62 relative to the workpiece at a machining end point P1 is in the X-axis direction. Therefore, when the machining starts, there is only a Z-axis direction vibration component, and there is no X-axis direction vibration component. As the tool 62 advances on a movement path, the vibration components in the respective drive-shaft directions change in such a manner that the Z-axis direction vibration component is gradually decreased, while the X-axis direction vibration component is gradually increased. At the end of machining, there is only the X-axis direction vibration component and no Z-axis direction vibration component. As described above, FIG. 8(b) and FIG. 8(c) illustrate a state where the vibration angle changes according to the movement direction of the tool 62.

In the first embodiment, a machining program is provided with a command for performing vibration cutting with a specified frequency and amplitude of vibrations to be applied along a movement path during machining. Also, the interpolation processing unit 48 calculates a combined movement amount by adding a vibrational-movement amount per unit time to a command-movement amount per unit time, and calculates axial movement amounts by decomposing the combined movement amount into components in respective drive-shaft directions so as to pass through on the movement path. Due to this operation, the control computation unit 40 makes it possible to apply vibrations along a machining path. Because vibrations are applied along the machining path, this can prevent cutting at a position outside of the machining path, and prevent a machining object from being excessively cut.

In a case where the combined movement amount is positioned on the opposite side of the machining start position in the machining direction, the combined movement amount is corrected such that the terminal position of the combined movement amount is limited up to the machining start point; and in a case where the combined movement amount passes the machining end position in the machining direction, the combined movement amount is corrected such that the terminal position of the combined movement amount is limited up to the machining end point. With this configuration, machining is not performed extending over the machining start and end positions.

Further, because a command for performing vibration cutting is described in a machining program, it is not necessary for the control computation unit 40 to hold a table regarding vibrations to be applied when machining. Also, the time and effort of inputting machining conditions regarding the vibrations to the table can be saved. Further, because vibrations are applied at the time of interpolation processing, higher-frequency vibrations can be generated to perform machining, as compared to the case where vibration conditions are directly instructed (repetitive forward movement and backward movement are instructed) by a machining program in which a longer interval than the interpolation processing is designated.

Figure 9:
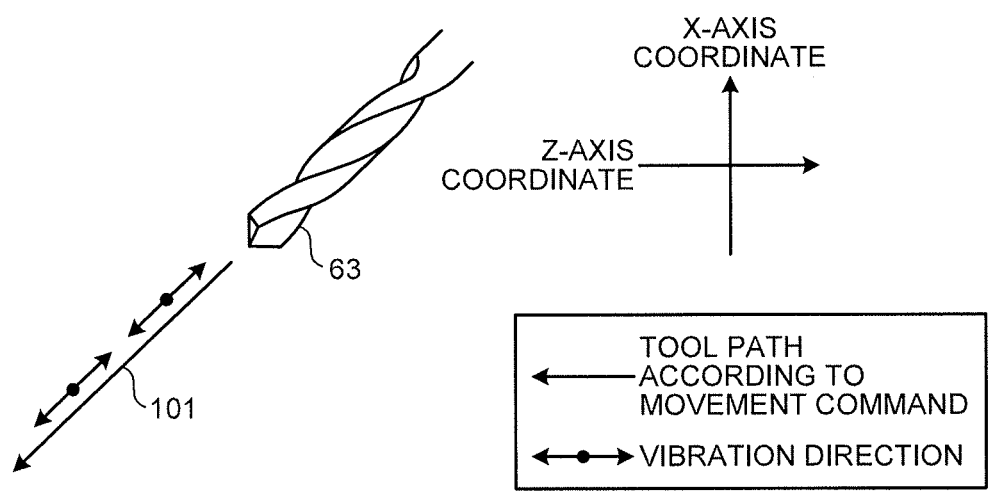
FIG. 9 is a diagram schematically illustrating a machining method with a drill according to the first embodiment.

In the first embodiment, the same vibration machining can also be performed in drilling. FIG. 9 is a diagram schematically illustrating a machining method with a drill according to the first embodiment. In the case of drilling using a drill 63, a contouring control is always executed linearly. A vibration control is also executed on the linear-shaped machining path. The vibration control can be executed on this linear-shaped machining path also in a slanted direction 101. In drilling, cutting at a position outside of a machining path 101 as described previously cannot occur. The drilling has the effect of not extending over the machining start and finish positions, and the effect of generating higher-frequency vibrations, similarly to the previous descriptions.

Second Embodiment

Figure 10:
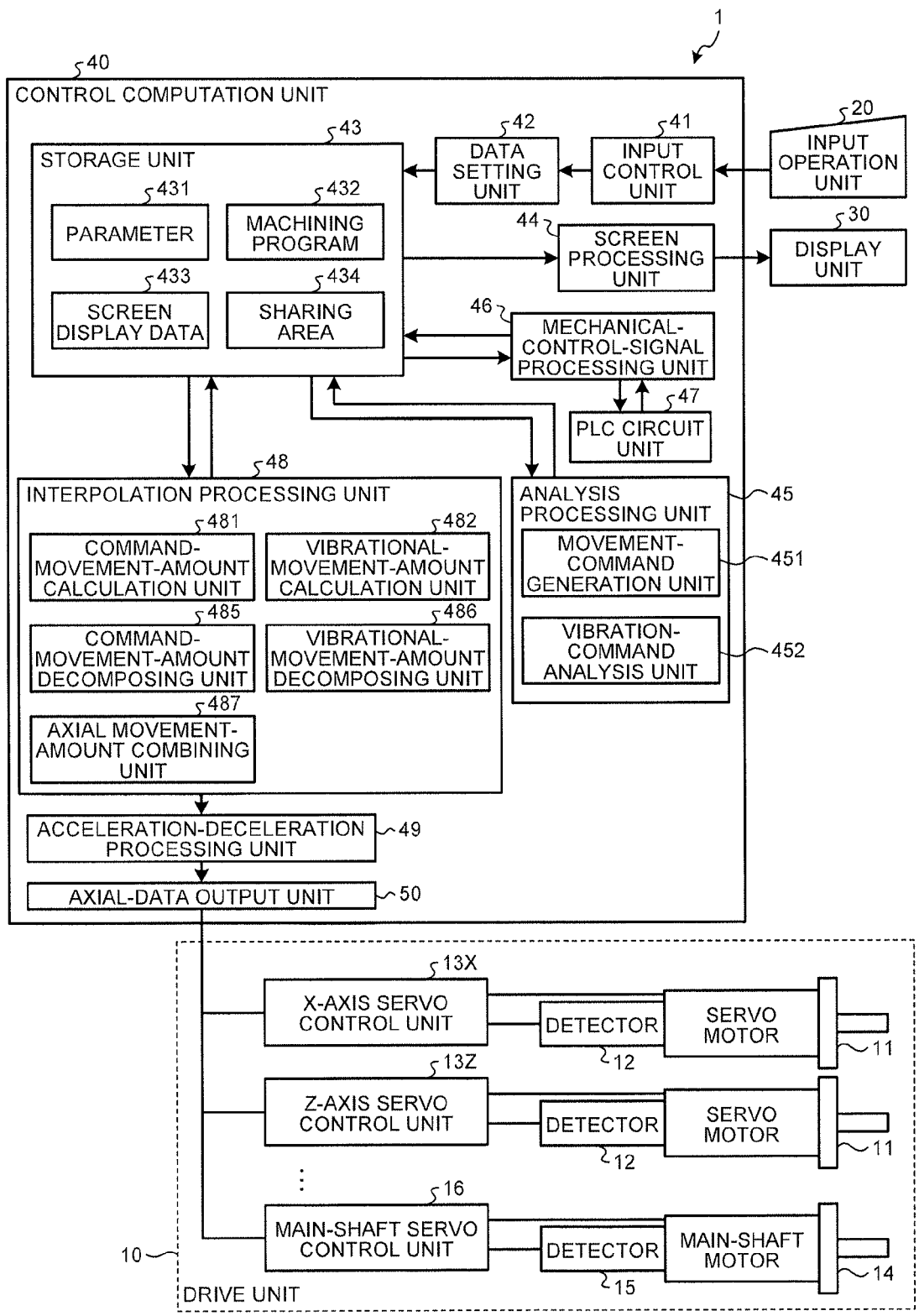
FIG. 10 is a block diagram illustrating a configuration example of a numerical control device according to a second embodiment.

FIG. 10 is a block diagram illustrating a configuration example of a numerical control device according to a second embodiment. In this numerical control device 1, the interpolation processing unit 48 is configured differently from that in the first embodiment. That is, the interpolation processing unit 48 includes the command-movement-amount calculation unit 481 that uses a movement command analyzed by the analysis processing unit 45 to calculate a command-movement amount that is a movement amount per unit time (an interpolation cycle), the vibrational-movement-amount calculation unit 482 that calculates a vibrational-movement amount that is a movement amount per unit time for vibrating a tool or a machining object, a command-movement-amount decomposing unit 485 that calculates axial command-movement amounts that are movement amounts of the command-movement amount in respective drive-shaft directions, a vibrational-movement-amount decomposing unit 486 that calculates axial vibrational-movement amounts that are movement amounts of the vibrational-movement amount in respective drive-shaft directions according to the ratio between the axial command-movement amounts for respective drive shafts, and an axial movement-amount combining unit 487 that calculates an axial combined movement amount for each of the drive shafts by adding the axial command-movement amount in each of the drive-shaft directions to the axial vibrational-movement amount in each of the drive-shaft directions. Constituent elements identical to those in the first embodiment are denoted by the same reference signs and explanations thereof will be omitted.

Figure 11:
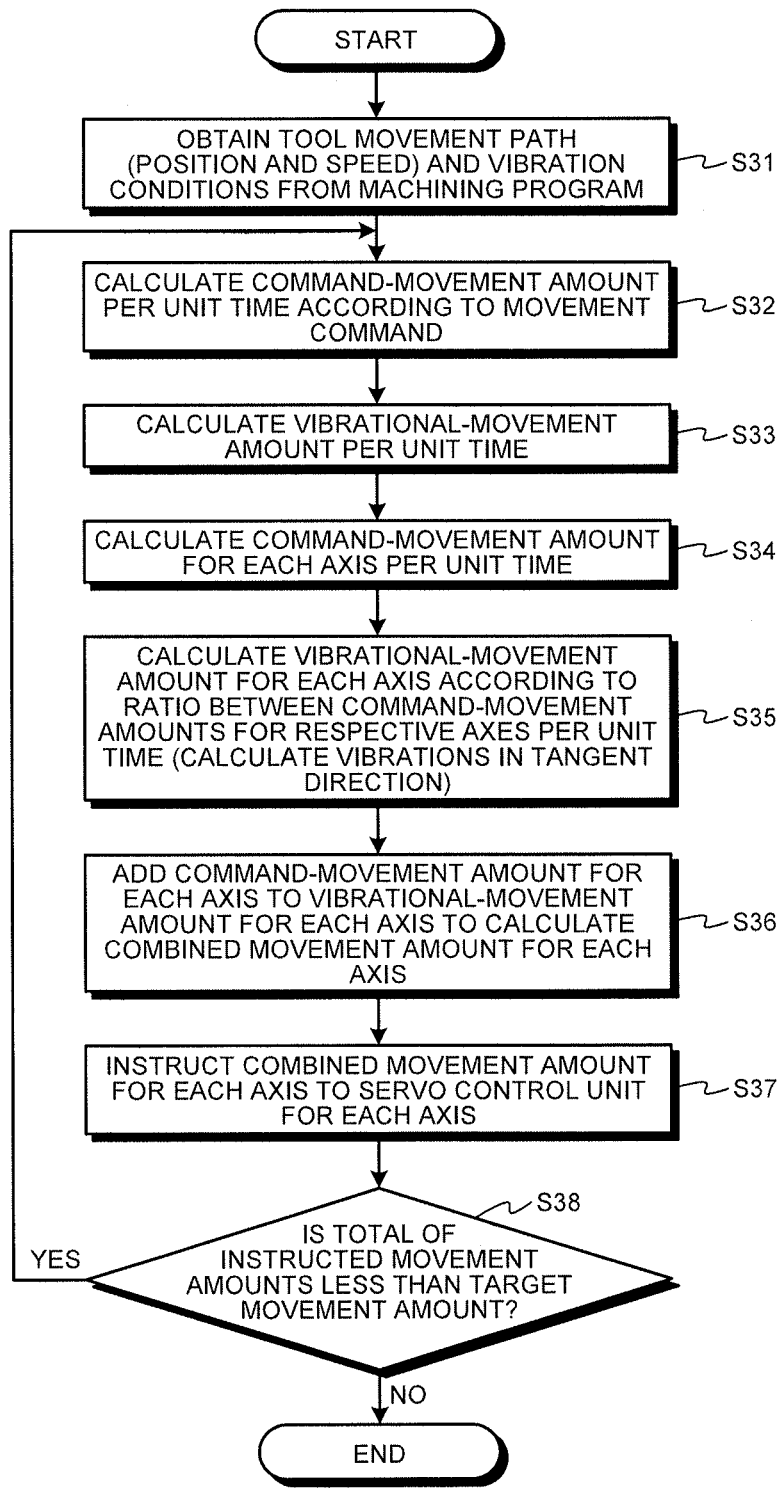
FIG. 11 is a flowchart illustrating a procedure example of interpolation processing with vibrations according to the second embodiment.

Next, a machining method performed by the numerical control device according to the second embodiment is described. FIG. 11 is a flowchart illustrating a procedure example of interpolation processing with vibrations according to the second embodiment.

First, similarly to Steps S11 to S13 in FIG. 2 in the first embodiment, the interpolation processing unit 48 obtains a movement command and vibration conditions that are both output from the analysis processing unit 45, then the command-movement-amount calculation unit 481 calculates a command-movement amount per unit time from the movement command, and the vibrational-movement-amount calculation unit 482 calculates a vibrational-movement amount per unit time from the vibration conditions (Steps S31 to S33).

Next, the command-movement-amount decomposing unit 485 divides the command-movement amount into components in respective drive-shaft directions to calculate axial command-movement amounts (Step S34). Due to this operation, the ratio between the axial command-movement amounts in the respective drive-shaft directions is obtained.

Thereafter, the vibrational-movement-amount decomposing unit 486 calculates axial vibrational-movement amounts by decomposing the vibrational-movement amount into components in the respective drive-shaft directions using the ratio between the divided command-movement amounts in the respective drive-shaft directions (Step S35).

Next, the axial movement-amount combining unit 487 adds the axial command-movement amount for each drive shaft acquired at Step S34 to the axial vibrational-movement amount for each drive shaft acquired at Step S35 to calculate an axial combined movement amount for each drive shaft (Step S36). The axial-data output unit 50 then outputs the calculated axial combined movement amount to the servo control unit 13 on each drive shaft (Step S37).

At Step S36, in the case where the terminal point of the axial combined movement amount for each drive shaft is located on the other side of the machining start position in the machining direction, or the case where the terminal point of the axial combined movement amount for each drive shaft passes over the machining finish position in the machining direction, an unintended region is also machined. Therefore, in the case where the terminal point of the axial combined movement amount for each drive shaft is located on the other side of the machining start position in the machining direction, the axial combined movement amount can be corrected such that the terminal point of the axial combined movement amount is up to the machining start point, or in the case where the terminal point of the combined movement amount for each drive shaft passes over the machining finish position in the machining direction, the axial combined movement amount can be corrected such that the terminal point of the axial combined movement amount is up to the machining finish point.

Thereafter, the command-movement-amount calculation unit 481 determines whether the total value of the previous instructed command-movement amounts is less than a target movement amount (Step S38). When the total value of the command-movement amounts is less than the target movement amount (YES at Step S38), the processing is returned to Step S32, and the above processing is performed repeatedly. In contrast, when the total value of the command-movement amounts reaches the target movement amount (NO at Step S38), the processing is finished because machining has advanced to a target position.

Figure 12:
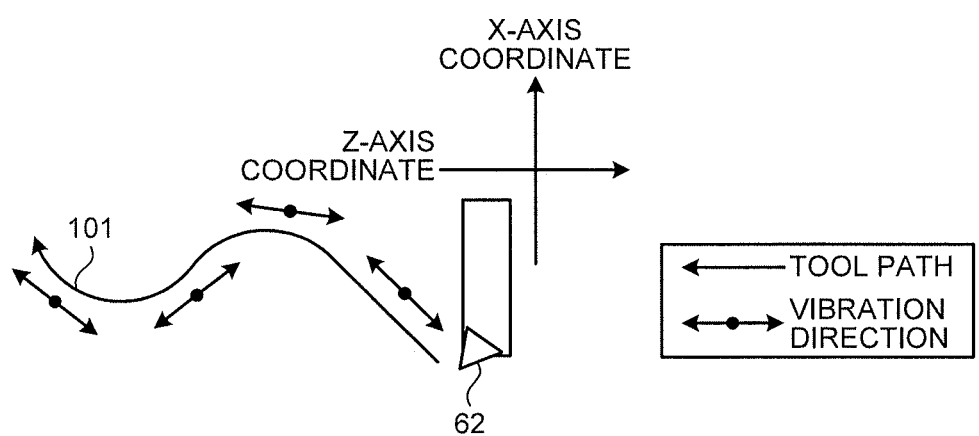
FIG. 12 is a diagram schematically illustrating a machining method according to the second embodiment.

FIG. 12 is a diagram schematically illustrating a machining method according to the second embodiment. FIG. 12 illustrates a case where the Z axis and the X axis that are perpendicular to each other are provided on the drawing sheet, and machining is performed while moving the tool 62 and a machining object relative to each other along the movement path 101 on this Z-X plane. In the second embodiment, when the tool 62 is moved relative to the machining object along the movement path 101, the tool 62 is vibrated in the tangential direction at the position corresponding to the interpolation cycle on the movement path 101. That is, in a straight-line section, the tool 62 is vibrated so as to move back and forth along the straight line, and in a curved-line section, the tool 62 is vibrated so as to move back and forth along the tangential direction at the position corresponding to the interpolation cycle.

Figure 13:
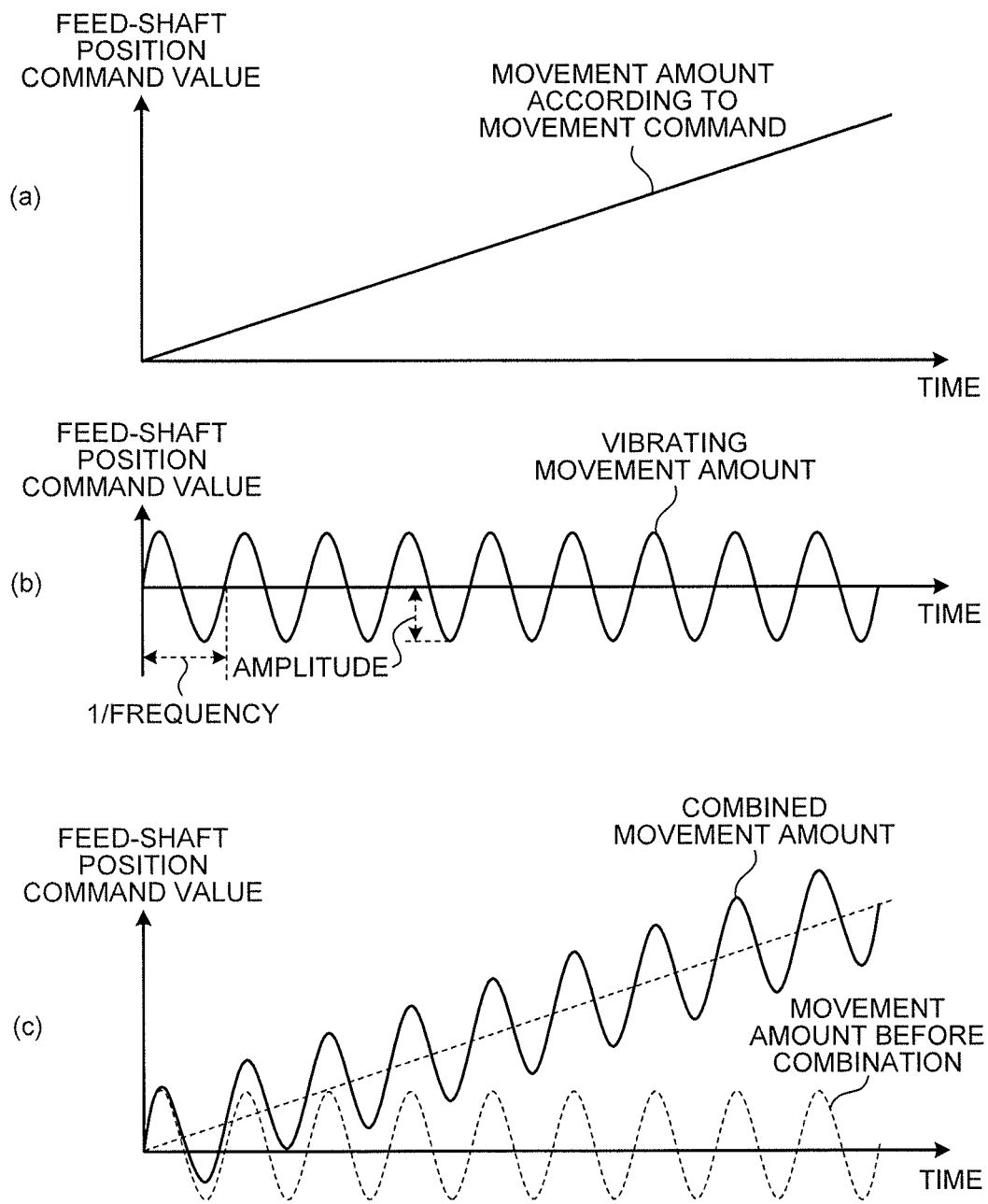
FIG. 13 are conceptual diagrams illustrating application of vibrations to a movement path according to the second embodiment.

FIG. 13 are conceptual diagrams illustrating application of vibrations to a movement path according to the second embodiment. FIG. 13(a) illustrates changes in command-movement amount with time. In FIG. 13(a), the horizontal axis represents time, and the vertical axis represents a feed-shaft position command value. As the time elapses, the feed-shaft position command value increases linearly.

FIG. 13(b) illustrates changes in vibrational-movement amount with time, in which the horizontal axis represents time, and the vertical axis represents a feed-shaft position command value. As the time elapses, the feed-shaft position command value periodically increases and decreases. In this example, the feed-shaft position command value is represented as a sine wave with respect to time. From FIG. 13(b), the amplitude and frequency (=1/wavelength) of vibrations to be applied are obtained. Conversely, each of the amplitude and frequency is set to any given value, and therefore any given vibrational-movement amount can be obtained.

FIG. 13(c) illustrates a combination of FIGS. 13(a) and 13(b). Also in FIG. 13(c), the horizontal axis represents time, and the vertical axis represents a feed-shaft position command value. In FIG. 13(c), a movement amount according to a movement command and a movement amount due to vibrations before they are combined are indicated by broken lines, and a combined movement amount obtained by combining these two movement amounts is indicated by the solid line. As described above, in the second embodiment, machining is performed while increasing and decreasing the movement amount relative to a movement amount according to a movement command.

Figure 14:
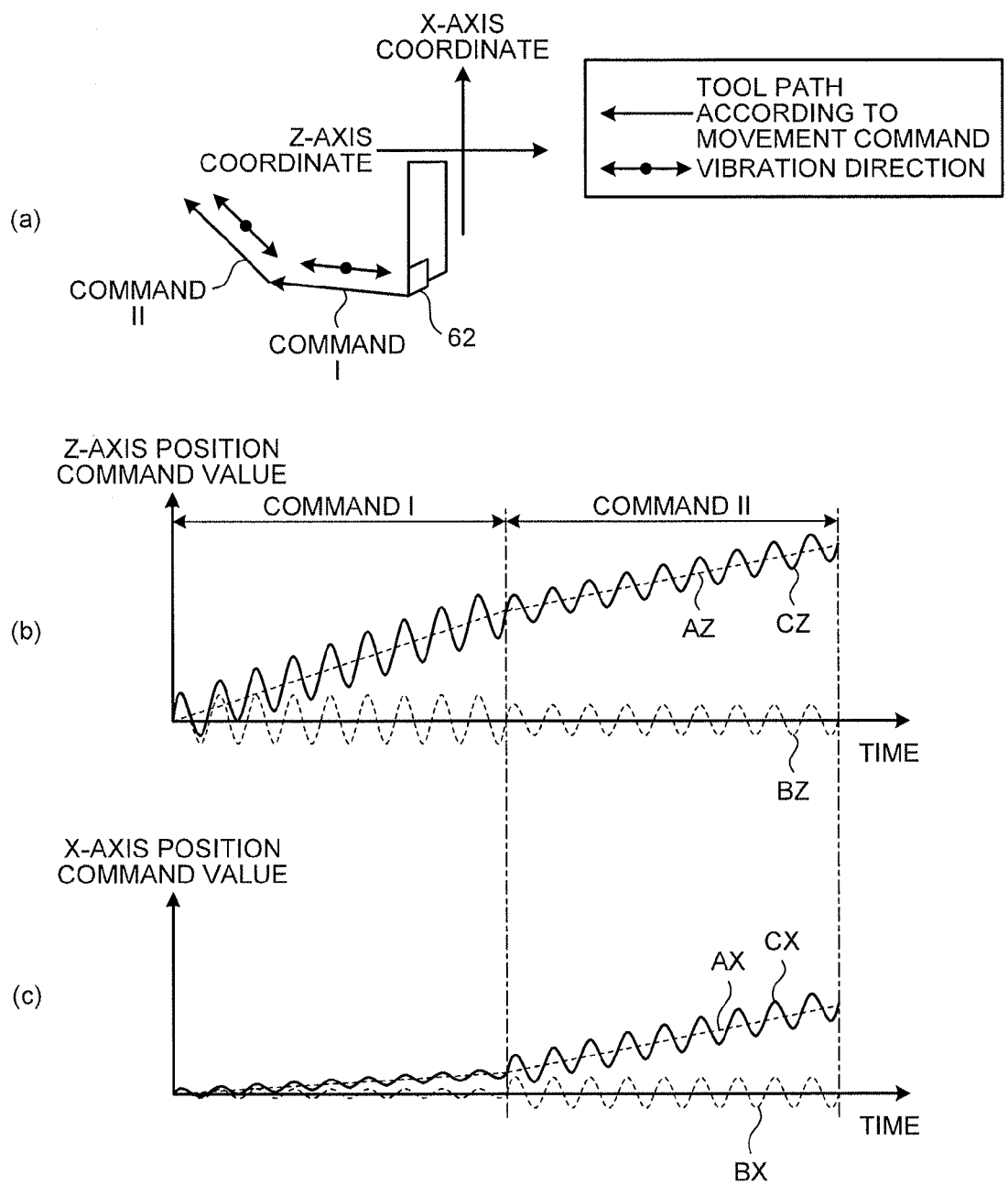
FIG. 14 are diagrams illustrating an example of changes in Z-axis and X-axis position command values with respect to time for performing machining processing according to the second embodiment.

FIG. 14 are diagrams illustrating an example of changes in Z-axis and X-axis position command values with an elapse of time for performing machining processing according to the second embodiment. FIG. 14(a) illustrates an example of a tool machining path. FIG. 14(a) illustrates an example of machining on two consecutive line segments, angled differently from each other and intersecting on the Z-X plane, as a movement path. In the case of a command I, the movement amount in the X-axis direction is smaller than the movement amount in the Z-axis direction. In the case of a command II, the movement amount in the X-axis direction is equal to the movement amount in the Z-axis direction.

FIG. 14(b) is a diagram illustrating changes in the Z-axis position command value with respect to time. FIG. 14(c) is a diagram illustrating changes in the X-axis position command value with respect to time. In FIG. 14(b), a straight line AZ indicates changes in position in the Z-axis direction from the start point of the movement path according to a movement command, and a curved line BZ indicates changes in position in the Z-axis direction due to vibrations. A curved line CZ indicates a combination of the straight line AZ and the curved line BZ. In FIG. 14(c), a straight line AX indicates changes in position in the X-axis direction from the start point of the movement path according to a movement command, and a curved line BX indicates changes in position in the X-axis direction due to vibrations. A curved line CX indicates a combination of the straight line AX and the curved line BX. At the command I, the movement amount in the Z-axis direction is larger than that in the X-axis direction. At the command II, the movement amount in the Z-axis direction is equal to that in the X-axis direction.

During the period in which each command is executed, a vibrational-movement amount per unit time is divided into the Z-axis and X-axis directions according to the ratio between axial command-movement amounts obtained by decomposing the command-movement amount in a direction specified by each command into the Z-axis and X-axis directions. As a result, during the period in which the command I is executed, the vibration component in the Z-axis direction is greater, and during the period in which the command II is executed, the vibration component in the Z-axis direction is equal to the vibration component in the X-axis direction.

In the second embodiment, effects identical to those of the first embodiment can be also obtained. In addition, as compared to the first embodiment, the second embodiment has an effect that arithmetic processing load thereof is reduced.

Third Embodiment

Figure 15:
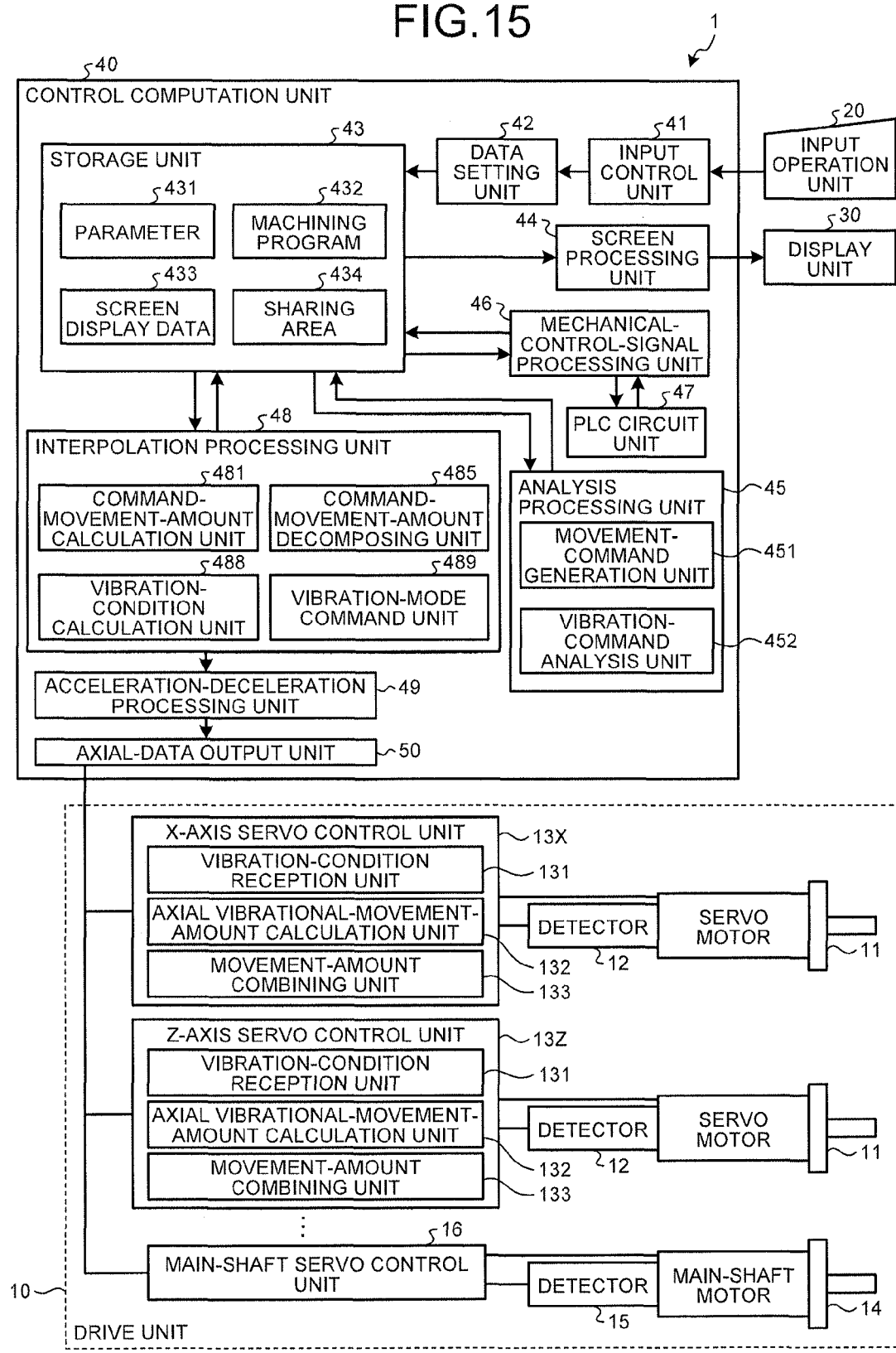
FIG. 15 is a block diagram illustrating a configuration example of a numerical control device according to a third embodiment.

FIG. 15 is a block diagram illustrating a configuration example of a numerical control device according to a third embodiment. In the second embodiment, vibrations are applied to a movement path according to a movement command. However, the numerical control device 1 according to the third embodiment is configured to cause the servo control units 13X, 13Z, . . . to perform the application of vibrations. The interpolation processing unit 48 and the servo control units 13X, 13Z, . . . on respective drive shafts are configured differently from those in the numerical control device in the second embodiment.

The interpolation processing unit 48 includes the command-movement-amount calculation unit 481 that uses a movement command analyzed by the analysis processing unit 45 to calculate a command-movement amount that is a movement amount per unit time (an interpolation cycle), the command-movement-amount decomposing unit 485 that calculates axial command-movement amounts that are movement amounts of the command-movement amount in respective drive-shaft directions, a vibration-condition calculation unit 488 that calculates vibration conditions for each drive shaft per unit time from the obtained vibration conditions, and a vibration-mode command unit 489 that notifies the servo control units 13X, 13Z, . . . on respective drive shafts of an on/off (execution/finish) command for machining in vibration mode. The vibration-condition calculation unit 488 allocates the amplitude in the vibration conditions according to the ratio between the axial command-movement amounts for respective drive shafts calculated by the command-movement-amount decomposing unit 485. The command-movement amounts for respective drive shafts, generated by the command-movement-amount decomposing unit 485, are output to the servo control units 13X, 13Z, . . . that control the respective drive shafts through the acceleration-deceleration processing unit 49 and the axial-data output unit 50.

The servo control unit 13 on each drive shaft (the X-axis servo control unit 13X and the Z-axis servo control unit 13Z) includes a vibration-condition reception unit 131 that receives an on/off command for executing machining in vibration mode from the control computation unit 40, and that receives an axial command-movement amount and vibration conditions for each drive shaft per unit time from the control computation unit 40, an axial vibrational-movement-amount calculation unit 132 that uses the received vibration conditions to calculate an axial vibrational-movement amount that is a movement amount due to vibrations per unit time, and a movement-amount combining unit 133 that calculates a movement amount by combining the axial command-movement amount received from the axial-data output unit 50 with the axial vibrational-movement amount calculated by the axial vibrational-movement-amount calculation unit 132, and that applies a current command according to the combined movement amount to the servo motor 11.

Figure 16:
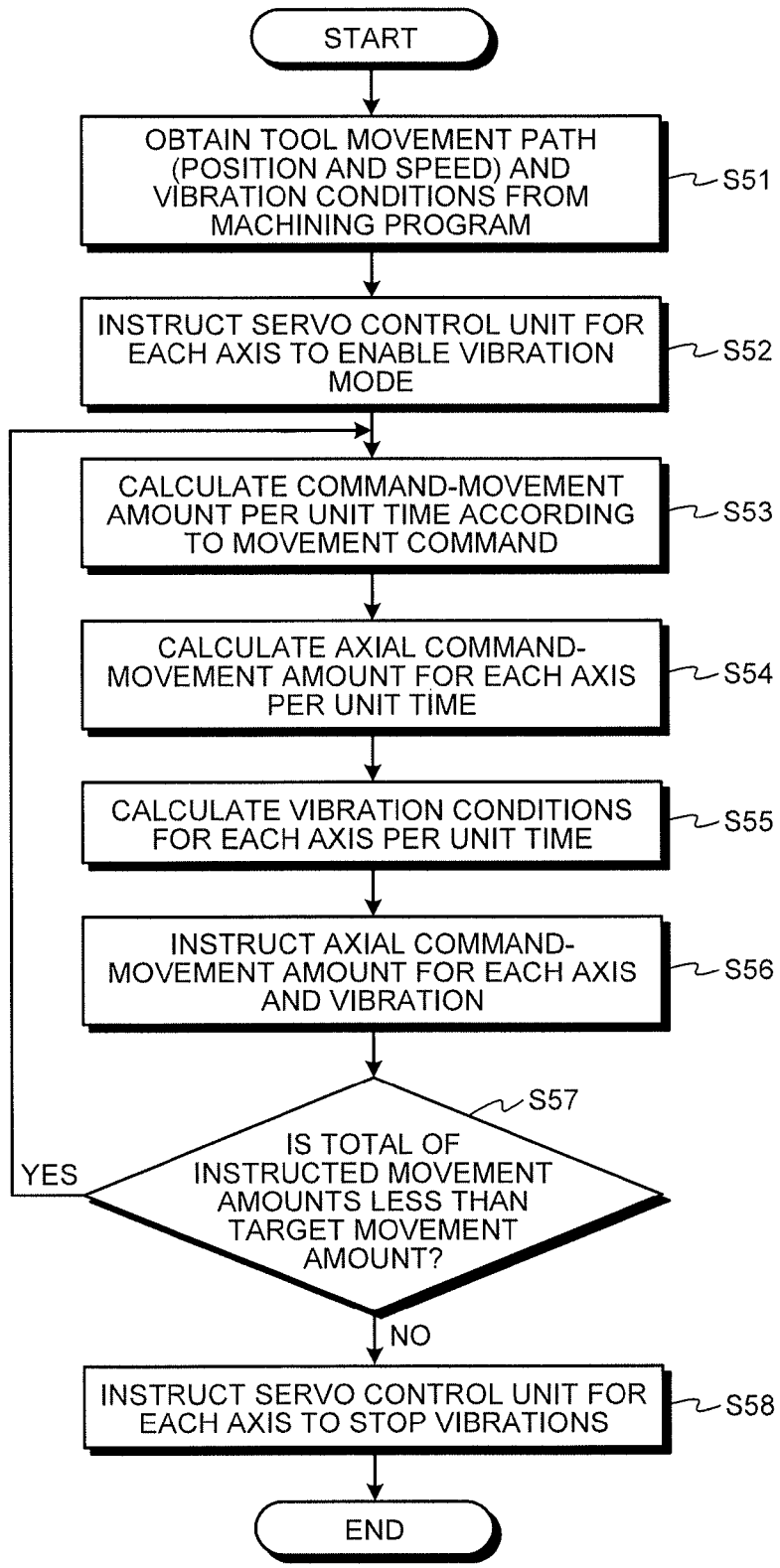
FIG. 16 is a flowchart illustrating a procedure example of interpolation processing with vibrations in a control computation unit according to the third embodiment.
Figure 17:
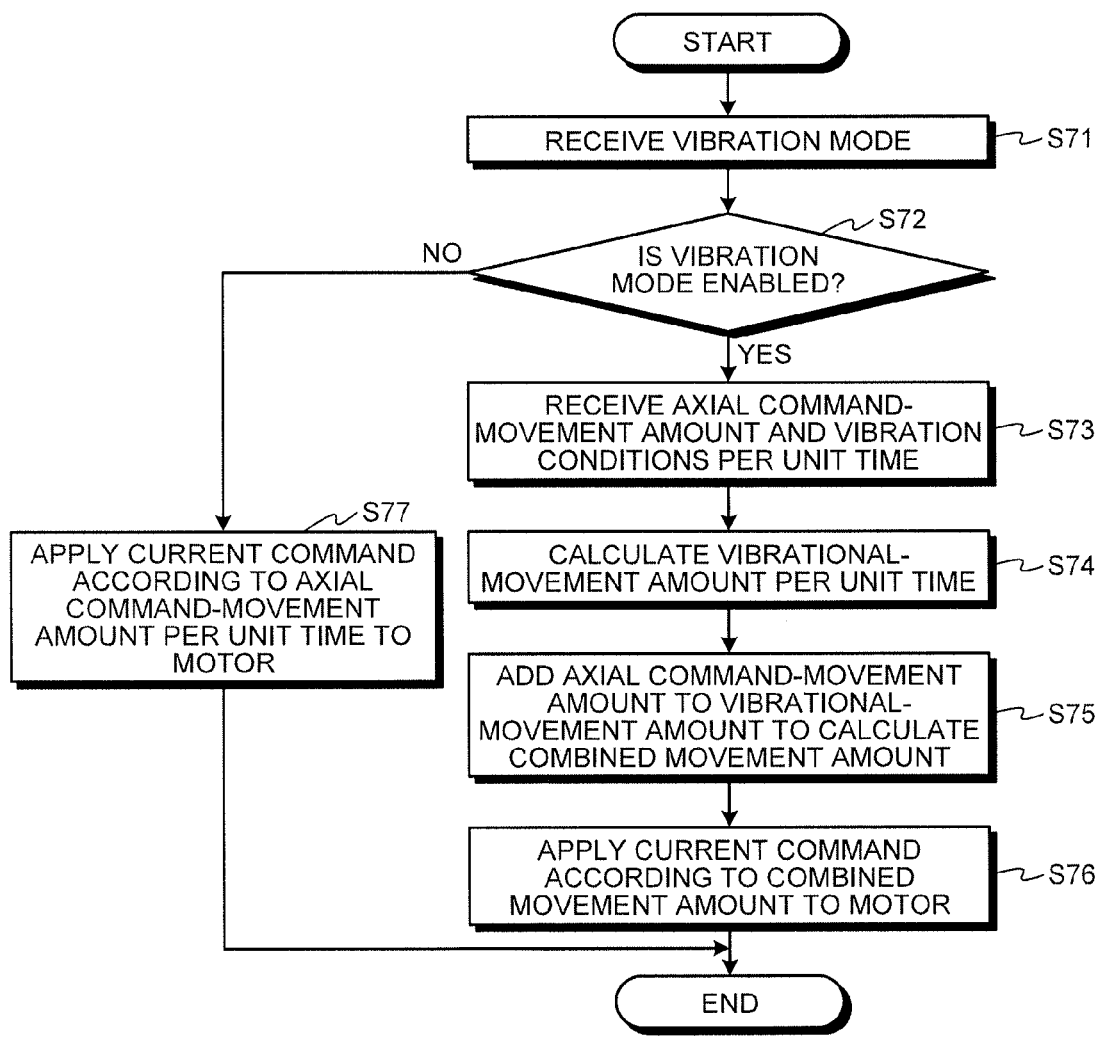
FIG. 17 is a flowchart illustrating a procedure example of processing for generating vibrations in a drive unit according to the third embodiment.

Next, a machining method performed by the numerical control device according to the third embodiment is described. FIG. 16 is a flowchart illustrating a procedure example of interpolation processing with vibrations in a control computation unit according to the third embodiment. FIG. 17 is a flowchart illustrating a procedure example of processing for generating vibrations in a drive unit according to the third embodiment.

Processing in the control computation unit 40 is first described with reference to FIG. 16. The movement-command generation unit 451 in the analysis processing unit 45 outputs a movement command including a target position, speed and a movement path of a tool and/or a machining object from a machining program to the interpolation processing unit 48. The vibration-command analysis unit 452 outputs vibration conditions, including frequency and amplitude, to the interpolation processing unit 48. The interpolation processing unit 48 obtains the movement command and the vibration conditions, which are both output from the analysis processing unit 45 (Step S51).

Next, upon receiving the vibration conditions from the analysis processing unit 45, the vibration-mode command unit 489 transmits a command for enabling the vibration mode to the servo control units 13X, 13Z, . . . on respective drive shafts (Step S52). Thereafter, based on the movement command, the command-movement-amount calculation unit 481 calculates a command-movement amount that is a movement amount according to the movement command per unit time (an interpolation cycle) (Step S53). This is acquired by a preset method depending on the type of interpolation such as linear interpolation or circular interpolation.

Thereafter, the command-movement-amount decomposing unit 485 divides the command-movement amount into components in respective drive-shaft directions to calculate axial command-movement amounts (Step S54). Due to this operation, the ratio between the axial command-movement amounts in the respective drive-shaft directions is obtained.

Next, the vibration-condition calculation unit 488 allocates the amplitude in the obtained vibration conditions based on the ratio between the axial command-movement amounts in the respective drive-shaft directions, obtained at Step S54, and calculates vibration conditions in the respective drive-shaft directions (Step S55).

Thereafter, the axial-data output unit 50 outputs the calculated axial command-movement amount for each drive shaft per unit time, and the vibration conditions for each drive shaft to the servo control units 13X, 13Z, . . . on the corresponding drive shafts (Step S56).

Thereafter, the command-movement-amount calculation unit 481 determines whether the total value of the previous instructed command-movement amounts is less than a target movement amount (Step S57). When the total value of the command-movement amounts is less than the target movement amount (YES at Step S57), the processing is returned to Step S53, and the above processing is performed repeatedly. In contrast, when the total value of the command-movement amounts reaches the target movement amount (NO at Step S57), machining has advanced to a target position. Therefore, the vibration-mode command unit 489 outputs a command for disabling (stopping) the vibration mode to the servo control units 13X, 13Z, . . . on the respective drive shafts (Step S58). The processing is then finished.

Next, processing in the drive unit 10 is described with reference to FIG. 17. First, upon receiving the vibration mode from the control computation unit 40 (Step S71), the vibration-condition reception unit 131 in each of the servo control units 13X, 13Z, . . . on the respective drive shafts determines whether the vibration mode is enabled (Step S72).

When the vibration mode is enabled (YES at Step S72), the vibration-condition reception unit 131 receives the axial command-movement amount per unit time and the vibration conditions per unit time, which are both transmitted from the control computation unit 40 (Step S73).

Next, the axial vibrational-movement-amount calculation unit 132 uses the obtained vibration conditions per unit time to calculate a vibrational-movement amount per unit time (Step S74). Thereafter, the movement-amount combining unit 133 adds the obtained axial command-movement amount per unit time to the calculated vibrational-movement amount to calculate a combined movement amount (Step S75). Then, a current command according to the combined movement amount is applied to the servo motor 11 (Step S76). The processing is then finished.

In contrast, when the vibration mode is not enabled at Step S72 (NO at Step S72), the vibration-condition reception unit 131 applies a current command according to the axial command-movement amount per unit time to the servo motor 11 (Step S77). The processing is then finished.

Due to the above configurations and procedures, processing identical to that of the second embodiment can be performed.

In the third embodiment, vibrations according to a vibration command instructed in a machining program are generated by the servo control units 13X, 13Z, . . . on the respective drive shafts. It is possible to execute the control in the servo control units 13X, 13Z, . . . in a cycle shorter than the interpolation cycle. Therefore, the effect of generating higher-frequency vibrations can be obtained in addition to the effects in the second embodiment.

In the above descriptions, a machining object and/or a tool are moved in two axial directions. However, there is also a case where a machining object and/or a tool are moved in three or more axial directions to perform machining.

Differences between Patent Literature 2 and the first to third embodiments are described. Patent Literature 2 relates to a numerical control device used for executing a contouring control, while performing chopping. The chopping operation described in Patent Literature 2 is intended for a grinding operation. While executing the contouring control along the shape to be ground using a grinding tool, machining is performed with the tool vibrated in a direction basically perpendicular to the direction of the contouring control (or in a direction intersecting the direction of the contouring control at a predetermined angle). Therefore, the machining described in Patent Literature 2 is essentially different in the vibration control from machining of the present application in which while performing turning machining using a bite (a tool for turning machining), that is, while executing the contouring control on the turning shape, the bite is vibrated in the direction of the contouring control. Accordingly, the vibration-control technique described in Patent Literature 2 is not applicable to the vibration-control technique of the present application. When the amplitude and cycle of vibrations used in practice are compared between chopping vibrations and vibrations of the present application, in contrast to the chopping vibrations with an amplitude of the order of millimeters, and a cycle of the order of several Hz, the vibrations of the present application have an amplitude of the order of several tens of microns or less, and a cycle of the order of several tens to several hundreds of Hz.

INDUSTRIAL APPLICABILITY

As described above, the numerical control device according to the present invention is suitable for numerical control of a machine tool using a machining program.

REFERENCE SIGNS LIST

1 numerical control device, 10 drive unit, 11 servo motor, 12 detector, 13 servo control unit, 13X X-axis servo control unit, 13Z Z-axis servo control unit, 14 main-shaft motor, 15 detector, 16 main-shaft servo control unit, 20 input operation unit, 30 display unit, control computation unit, 41 input control unit, 42 data setting unit, 43 storage unit, 44 screen processing unit, 45 analysis processing unit, 46 mechanical-control-signal processing unit, 47 PLC circuit unit, 48 interpolation processing unit, 49 acceleration-deceleration processing unit, 50 axial-data output unit, 61 machining object, 62 tool, 131 vibration-condition reception unit, 132 axial vibrational-movement-amount calculation unit, 133 movement-amount combining unit, 451 movement-command generation unit, 452 vibration-command analysis unit, 481 command-movement-amount calculation unit, 482 vibrational-movement-amount calculation unit, 483 movement-amount combining unit, 484 combined-movement-amount decomposing unit, 485 command-movement-amount decomposing unit, 486 vibrational-movement-amount decomposing unit, 487 axial movement-amount combining unit, 488 vibration-condition calculation unit, 489 vibration-mode command unit.

The invention claimed is:

1. A numerical control device by which machining is performed on a machining object while moving a tool and the machining object relative to each other by two or more drive shafts provided in at least one of the tool and the machining object, the numerical control device comprising:
  an analysis processing unit that obtains a movement command for moving on a curved movement path in a machining program, and vibration conditions for vibrating along the curved movement path;
  a command-movement-amount calculation unit that calculates a command-movement amount that is a movement amount per unit time according to the movement command;
  a vibrational-movement-amount calculation unit that uses the vibration conditions to calculate a vibrational-movement amount that is a movement amount due to vibrations per the unit time at a time corresponding to the movement command; and
  a movement-amount combining unit that combines the command-movement amount with the vibrational-movement amount to calculate a combined movement amount, and that acquires a target position within the unit time such that the target position, which has moved from a reference position for calculating the combined movement amount by the combined movement amount, is located on the curved movement path.

2. The numerical control device according to claim 1, wherein
  the vibration conditions include frequency and amplitude, and
  the vibrational-movement-amount calculation unit generates a sine wave from the vibration conditions, and uses the sine wave to calculate the vibrational-movement amount at a time corresponding to the movement command.

3. A numerical control device comprising:
  a drive-shaft control unit that controls motors connected respectively to two or more drive shafts provided in at least one of a tool and a machining object, and that is provided to each of the motors; and
  a control computation unit that instructs the drive-shaft control unit to perform machining on the machining object, while moving the tool and the machining object relative to each other, wherein
  the control computation unit includes:
    an analysis processing unit that obtains a movement command for moving on a movement path in a machining program, and vibration conditions for vibrating along the movement path,
    a command-movement-amount calculation unit that calculates a command-movement amount that is a movement amount per unit time according to the movement command, and
    a vibration-condition calculation unit that calculates, from the vibration conditions and a ratio between axial command-movement amounts obtained by decomposing the command-movement amount into directions of the two or more drive shafts, vibration conditions for each of the drive shafts, and
  the drive-shaft control unit includes:
    an axial vibrational-movement-amount calculation unit that calculates an axial vibrational-movement amount that is a movement amount due to vibrations per the unit time from the vibration conditions for each of the drive shafts received from the control computation unit, and
    a movement-amount combining unit that calculates a combined movement amount by combining one of the axial command-movement amounts with the axial vibrational-movement amount.

4. The numerical control device according to claim 3, wherein
  the vibration conditions include frequency and amplitude, and
  the vibration-condition calculation unit in the control computation unit generates a sine wave from the vibration conditions, and uses the sine wave to calculate the vibration conditions for each of the drive shafts at a time corresponding to the movement command.

* * * * *